(12) United States Patent
Gupta et al.

(10) Patent No.: US 12,505,279 B2
(45) Date of Patent: Dec. 23, 2025

(54) METHOD AND SYSTEM FOR DOMAIN ADAPTATION OF SOCIAL MEDIA TEXT USING LEXICAL DATA TRANSFORMATIONS

(71) Applicant: JPMorgan Chase Bank, N.A., New York, NY (US)

(72) Inventors: Akshat Gupta, New York, NY (US); Xiaomo Liu, Manhasset, NY (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 410 days.

(21) Appl. No.: 18/103,858

(22) Filed: Jan. 31, 2023

(65) Prior Publication Data

US 2024/0256760 A1    Aug. 1, 2024

(51) Int. Cl.
| | |
|---|---|
| G06F 40/16 | (2020.01) |
| G06F 40/117 | (2020.01) |
| G06F 40/134 | (2020.01) |
| G06F 40/169 | (2020.01) |
| G06F 40/237 | (2020.01) |

(Continued)

(52) U.S. Cl.
CPC .......... *G06F 40/16* (2020.01); *G06F 40/117* (2020.01); *G06F 40/134* (2020.01); *G06F 40/169* (2020.01); *G06F 40/237* (2020.01); *G06F 40/253* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 8,661,327 B1 * | 2/2014 | Channakeshava | ............................ G06Q 30/0261 715/205 |
| 9,251,530 B1 * | 2/2016 | Dachis | .................. G06Q 50/01 |

(Continued)

FOREIGN PATENT DOCUMENTS

| | | | | |
|---|---|---|---|---|
| CN | 103268339 B | * | 6/2016 | |
| CN | 111709242 B | * | 2/2024 | ....... G06F 16/90344 |

OTHER PUBLICATIONS

Zheng et al., "Robust Machine Translation with Domain Sensitive Pseudo-Sources: Baidu-OSU WMT19 MT Robustness Shared Task System Report" (Year: 2019).*

*Primary Examiner* — Paras D Shah
*Assistant Examiner* — Jacob B Vogt
(74) *Attorney, Agent, or Firm* — Greenblum & Bernstein, P.L.C.

(57) ABSTRACT

A method and a system for performing domain adaptations of social media text by using lexical data transformations are provided. The method includes: receiving a first data set that is usable for training a machine learning (ML) model that is designed to perform natural language processing tasks; training the ML model by using the first data set; receiving a second data set that relates to a social media platform; transforming a subset of the first data set into a third data set that is suitable for the social media platform; and retraining the ML model by using a combination of the first data set, the second data set, and the third data set. The transformations may include injecting emojis, emoticons, user mention indicators, hashtags, retransmission indicators, URLs, and/or inverse lexical normalizations that are often used in social media posts.

15 Claims, 6 Drawing Sheets

(51) Int. Cl.
*G06F 40/253* (2020.01)
*G06N 20/00* (2019.01)

(56) References Cited

U.S. PATENT DOCUMENTS

| | | | |
|---|---|---|---|
| 10,719,779 B1* | 7/2020 | Sagduyu | G06F 16/9024 |
| 2014/0229912 A1* | 8/2014 | Furtado | G06F 8/20 |
| | | | 717/120 |
| 2015/0200902 A1* | 7/2015 | Gandhi | H04L 51/52 |
| | | | 709/206 |
| 2019/0197128 A1* | 6/2019 | Martinez Iraola | G06F 16/3329 |
| 2019/0207902 A1* | 7/2019 | Gupta | H04L 51/216 |
| 2020/0073485 A1* | 3/2020 | Al-Halah | G06F 16/5846 |
| 2020/0273570 A1* | 8/2020 | Subramanian | G06N 20/00 |
| 2021/0216904 A1* | 7/2021 | Khurana | G06F 30/27 |
| 2022/0101952 A1* | 3/2022 | Ahmed | G16B 50/20 |
| 2022/0215169 A1* | 7/2022 | Edwards | G06N 20/00 |
| 2022/0215958 A1* | 7/2022 | Kong | G16H 50/20 |
| 2022/0300853 A1* | 9/2022 | Gonzalez Sanchez | |
| | | | G06F 21/6245 |
| 2022/0335332 A1* | 10/2022 | Kim | G06N 3/0475 |
| 2023/0148116 A1* | 5/2023 | Stokes, III | G06N 3/08 |
| | | | 726/23 |
| 2024/0020482 A1* | 1/2024 | Chen | G06F 40/169 |
| 2024/0232528 A9* | 7/2024 | Muraoka | G06F 40/295 |
| 2024/0396856 A1* | 11/2024 | Chen | G06V 10/40 |

* cited by examiner

600

ORIGINAL : And , um , i 'm just super excited .
[CCONJ PUNCT INTJ PUNCT PRON AUX ADV ADJ PUNCT]
TRANSFORMED : en , um , im 'm jst #super excited , URL4699
[CCONJ PUNCT INTJ PUNCT PRON AUX ADV ADJ PUNCT X]

ORIGINAL : How do people look at and experience art ?
[ADV AUX NOUN VERB ADP CCONJ VERB NOUN PUNCT]
TRANSFORMED : RT @USER5899 hw do people look n andd experience art ?
[X X ADV AUX NOUN VERB ADP CCONJ VERB NOUN PUNCT]

FIG. 6

METHOD AND SYSTEM FOR DOMAIN ADAPTATION OF SOCIAL MEDIA TEXT USING LEXICAL DATA TRANSFORMATIONS

BACKGROUND

1. Field of the Disclosure

This technology generally relates to performing natural language processing with respect to textual information associated with social media, and more particularly to methods and systems for performing domain adaptations of social media text by using lexical data transformations in order to improve performance in a machine learning model that is designed to perform natural language processing tasks.

2. Background Information

In a typical machine learning setting, training, development and test sets are usually carved out from the same data collection effort. In doing this, models are caveated with an implicit assumption, i.e., that the deployment dataset should belong to the same distribution as the training dataset. However, in practice, this is rarely the case, and therefore, significant drops in performance often occur when the model is deployed. The mismatch between the deployment dataset distribution, or target domain, and the training data distribution, or source domain, is known as domain shift, and the process of adapting to target domain distributions is known as domain adaptation.

The most widely studied domain adaptation methods are what are known as model-centric methods, where parts of the model including the feature space, the loss function or even the structure of the model are altered. Another popular set of approaches for domain adaptation with natural language are data-centric methods. These methods usually involve some form of bootstrapping and pseudo-labeling of the target domain data. Another popular data-centric domain adaptation method is data selection, which is an intermediate training step which aims to select a subset of data that is closest to the target domain.

However, each of these methods fails to address the fundamental reason behind the need for domain adaptation, i.e., domain shift. If the source domain dataset is transformed such that the domain mismatch between the source domain and the target domain is reduced, while retaining an ability to exploit the annotated source domain corpus, the models trained on such a transformed source domain will naturally perform better on the target domain.

For example, a source domain dataset may be a standard English dataset and a target domain may be textual information as used in social media. Performing natural language processing tasks on social media text is vital, especially in the finance industry, where a large number of signals are derived from social media text. However, social media text is noisy, and there is insufficient annotated data that is available for constructing machine learning models.

Accordingly, there is a need for a method for performing domain adaptations of social media text by using lexical data transformations, in order to improve performance in a machine learning model that is designed to perform natural language processing tasks.

SUMMARY

The present disclosure, through one or more of its various aspects, embodiments, and/or specific features or sub-components, provides, inter alia, various systems, servers, devices, methods, media, programs, and platforms for performing domain adaptations of social media text by using lexical data transformations, in order to improve performance in a machine learning model that is designed to perform natural language processing tasks.

According to an aspect of the present disclosure, a method for performing domain adaptations of social media text by using lexical data transformations is provided. The method is implemented by at least one processor. The method includes: receiving, by the at least one processor, a first data set that is usable for training a first machine learning (ML) model that is designed to perform natural language processing tasks; training, by the at least one processor, the first ML model by using the first data set; receiving, by the at least one processor, a second data set that relates to a social media platform; transforming, by the at least one processor, a subset of the first data set into a third data set that is suitable for the social media platform; and retraining, by the at least one processor, the first ML model by using a combination of the first data set, the second data set, and the third data set.

The method may further include annotating each of the first data set and the second data set by performing a part-of-speech (POS) tagging operation on each item included in each of the first data set and the second data set.

The transforming may include injecting at least one from among at least one emoji and at least one emoticon into at least one sentence included in the first data set.

The transforming may include performing an inverse lexical normalization for at least one from among at least one word and at least one phrase included in the first data set.

The transforming may include injecting at least one user mention by adding an "@" sign to at least one proper noun included in the first data set.

The transforming may include injecting at least one hashtag by adding a "#" sign to at least one proper noun included in the first data set.

The transforming may include injecting at least one indication that a social media post has been retransmitted to at least one sentence included in the first data set.

The social media platform may be Twitter®. The at least one indication that the social media post has been retransmitted may include a re-tweet indication.

The transforming may include injecting at least one Uniform Resource Locator (URL) to at least one sentence included in the first data set.

According to another exemplary embodiment, a computing apparatus for performing domain adaptations of social media text by using lexical data transformations is provided. The computing apparatus includes a processor; a memory; and a communication interface coupled to each of the processor and the memory. The processor is configured to: receive, via the communication interface, a first data set that is usable for training a first machine learning (ML) model that is designed to perform natural language processing tasks; train the first ML model by using the first data set; receive, via the communication interface, a second data set that relates to a social media platform; transform a subset of the first data set into a third data set that is suitable for the social media platform; and retrain the first ML model by using a combination of the first data set, the second data set, and the third data set.

The processor may be further configured to annotate each of the first data set and the second data set by performing a part-of-speech (POS) tagging operation on each item included in each of the first data set and the second data set.

The processor may be further configured to perform the transformation by injecting at least one from among at least one emoji and at least one emoticon into at least one sentence included in the first data set.

The processor may be further configured to perform the transformation by performing an inverse lexical normalization for at least one from among at least one word and at least one phrase included in the first data set.

The processor may be further configured to perform the transformation by injecting at least one user mention by adding an "@" sign to at least one proper noun included in the first data set.

The processor may be further configured to perform the transformation by injecting at least one hashtag by adding a "#" sign to at least one proper noun included in the first data set.

The processor may be further configured to perform the transformation by injecting at least one indication that a social media post has been retransmitted to at least one sentence included in the first data set.

The social media platform may be Twitter®. The at least one indication that the social media post has been retransmitted may include a re-tweet indication.

The processor may be further configured to perform the transformation by injecting at least one Uniform Resource Locator (URL) to at least one sentence included in the first data set.

According to yet another exemplary embodiment, a non-transitory computer readable storage medium storing instructions for performing domain adaptations of social media text by using lexical data transformations is provided. The storage medium includes executable code which, when executed by a processor, causes the processor to: receive a first data set that is usable for training a first machine learning (ML) model that is designed to perform natural language processing tasks; train the first ML model by using the first data set; receive a second data set that relates to a social media platform; transform a subset of the first data set into a third data set that is suitable for the social media platform; and retrain the first ML model by using a combination of the first data set, the second data set, and the third data set.

When executed by the processor, the executable code may be further configured to cause the processor to annotate each of the first data set and the second data set by performing a part-of-speech (POS) tagging operation on each item included in each of the first data set and the second data set.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a diagram that illustrates sentences that have been transformed by applying a method for performing domain adaptations of social media text by using lexical data transformations, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
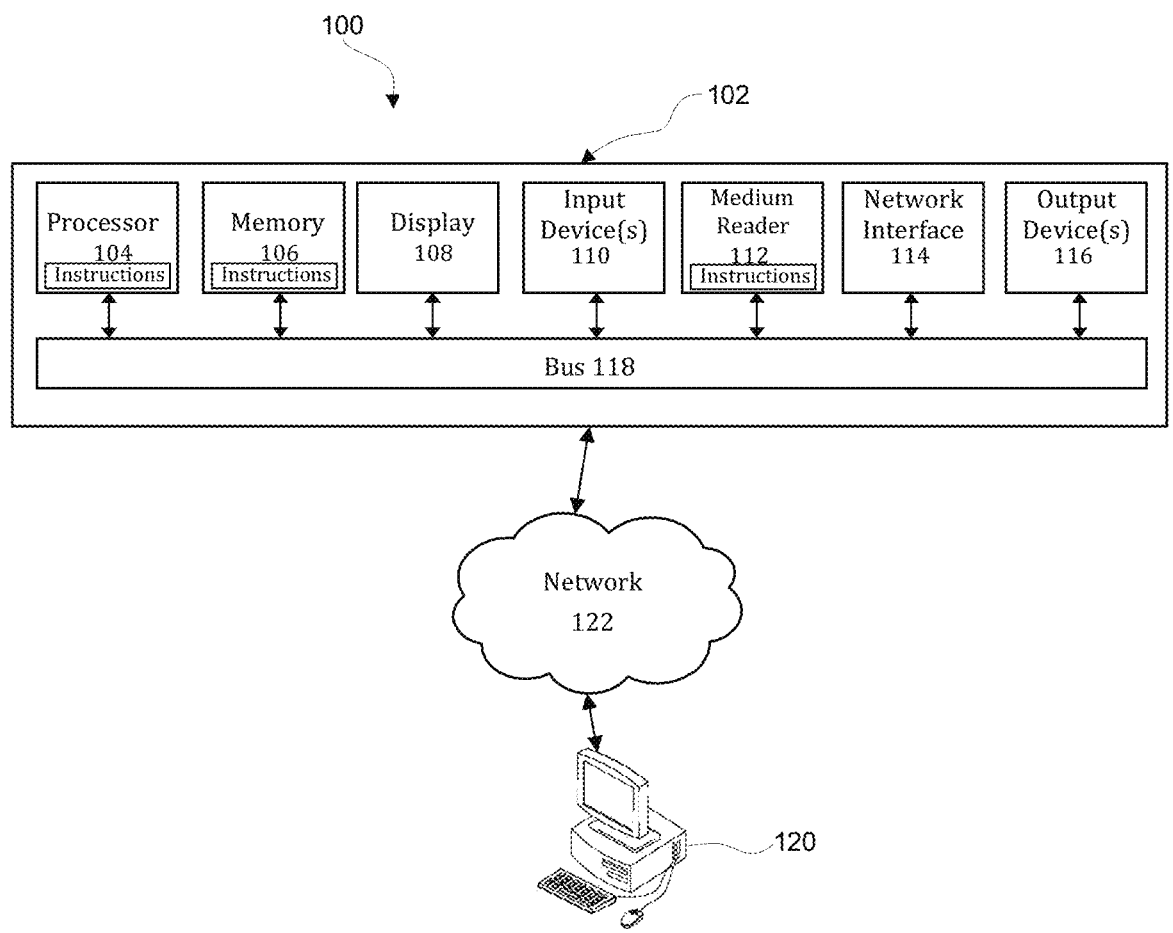
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray® disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for performing domain adaptations of social media text by using lexical data transformations in order to improve performance in a machine learning model that is designed to perform natural language processing tasks.

Figure 2:
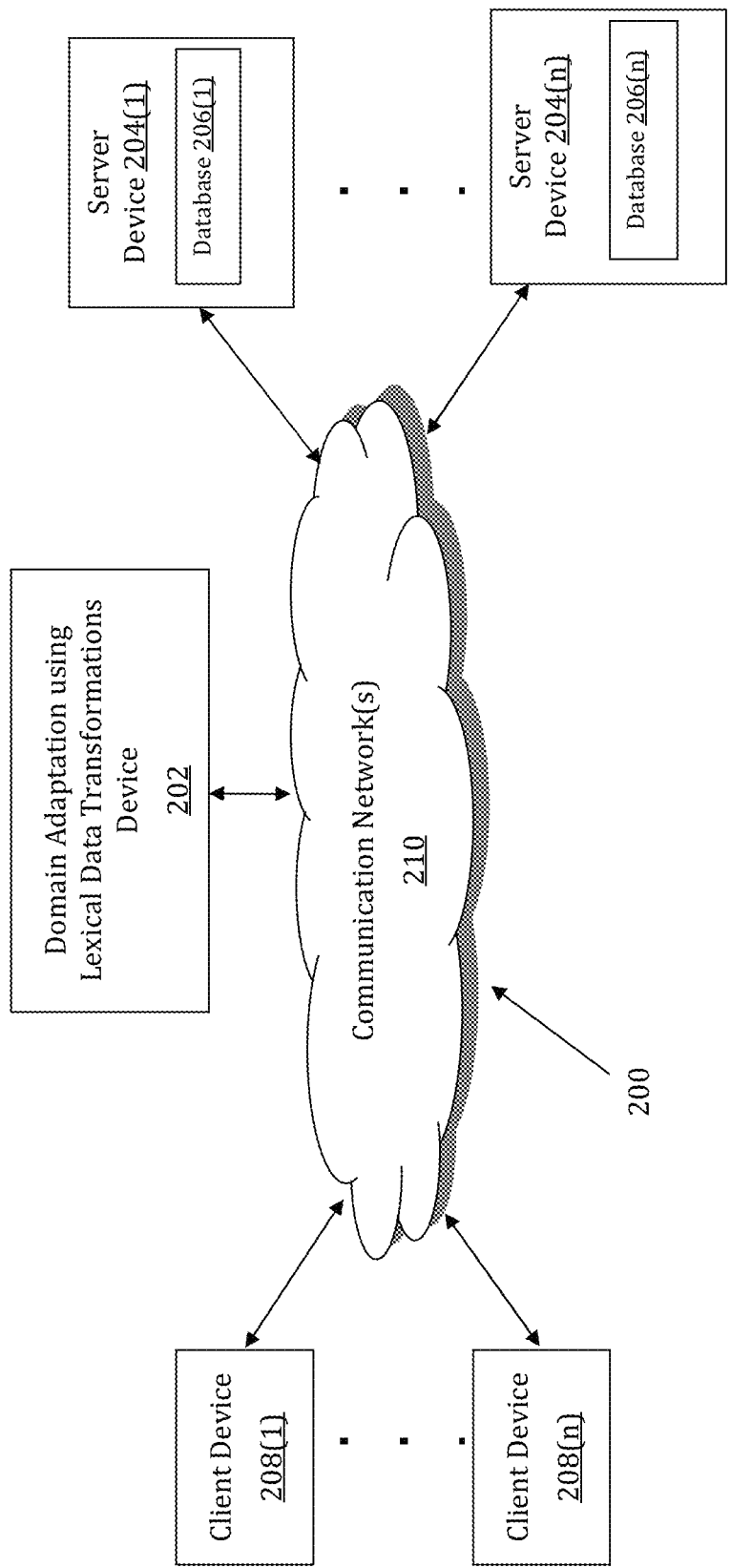
FIG. 2 illustrates an exemplary diagram of a network environment.

Referring to FIG. 2, a schematic of an exemplary network environment 200 for implementing a method for performing domain adaptations of social media text by using lexical data transformations in order to improve performance in a machine learning model that is designed to perform natural language processing tasks is illustrated. In an exemplary embodiment, the method is executable on any networked computer platform, such as, for example, a personal computer (PC).

The method for performing domain adaptations of social media text by using lexical data transformations in order to improve performance in a machine learning model that is designed to perform natural language processing tasks may be implemented by a Domain Adaptation using Lexical Data Transformations (DALDT) device 202. The DALDT device 202 may be the same or similar to the computer system 102 as described with respect to FIG. 1. The DALDT device 202 may store one or more applications that can include executable instructions that, when executed by the DALDT device 202, cause the DALDT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DALDT device 202 itself, may be located in virtual server(s) running in a cloud-based computing environment rather than being tied to one or more specific physical network computing devices. Also, the application(s) may be running in one or more virtual machines (VMs) executing on the DALDT device 202. Additionally, in one or more embodiments of this technology, virtual machine(s) running on the DALDT device 202 may be managed or supervised by a hypervisor.

In the network environment 200 of FIG. 2, the DALDT device 202 is coupled to a plurality of server devices 204(1)-204(n) that hosts a plurality of databases 206(1)-206(n), and also to a plurality of client devices 208(1)-208(n) via communication network(s) 210. A communication interface of the DALDT device 202, such as the network interface 114 of the computer system 102 of FIG. 1, operatively couples and communicates between the DALDT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DASDT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DALDT devices that efficiently implement a method for performing domain adaptations of social media text by using lexical data transformations in order to improve performance in a machine learning model that is designed to perform natural language processing tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DALDT device 202 may be a standalone device or integrated with one or more other devices or apparatuses, such as one or more of the server devices 204(1)-204(n), for example. In one particular example, the DALDT device 202 may include or be hosted by one of the server devices 204(1)-204(n), and other arrangements are also possible. Moreover, one or more of the devices of the DALDT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DALDT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store standard English textual information that is usable for training a model and lexical data that relates to social media formats and usages.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DALDT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DALDT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DALDT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DALDT device 202, the server devices 204(1)-204(n), or the client devices 208(1)-208(n), for example, may be configured to operate as virtual instances on the same physical machine. In other words, one or more of the DALDT device 202, the server devices 204(1)-204(n), or the client devices 208(1)-208(n) may operate on the same physical device rather than as separate devices communicating through communication network(s) 210. Additionally, there may be more or fewer DALDT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
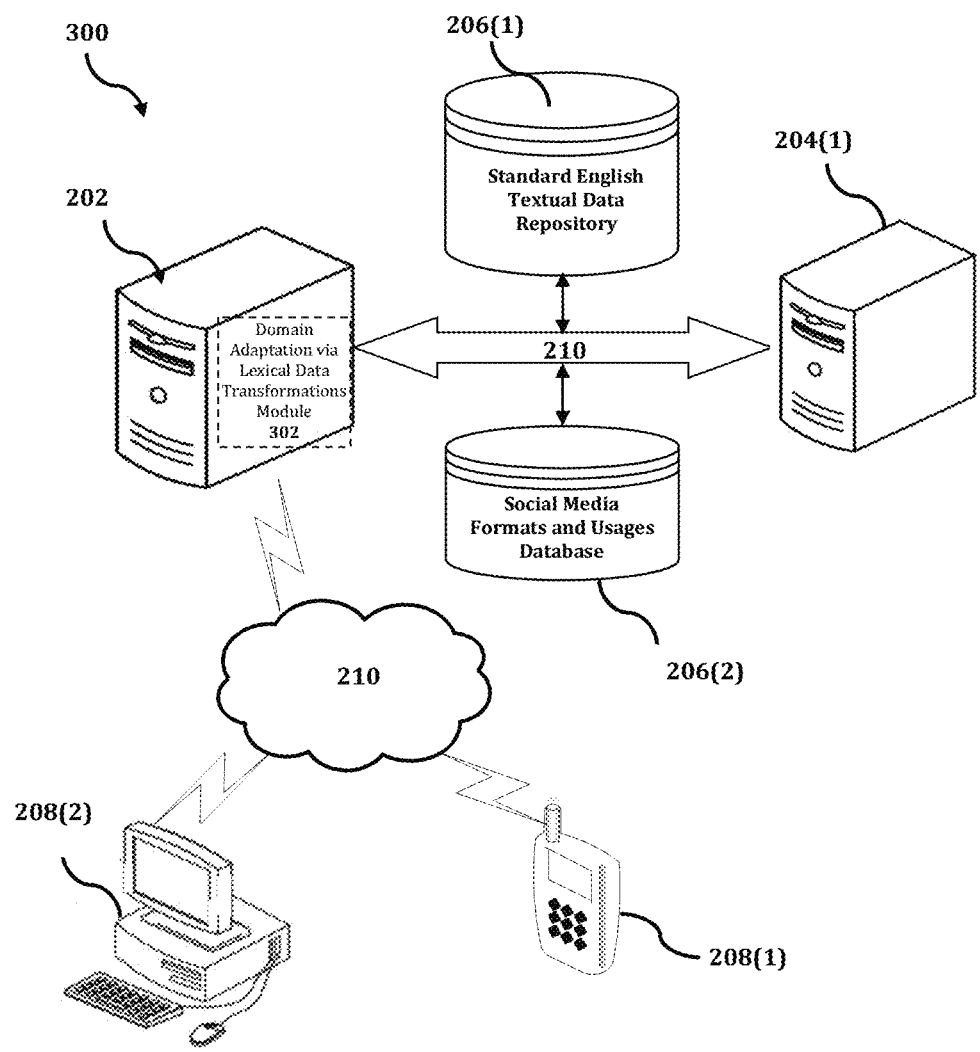
FIG. 3 shows an exemplary system for implementing a method for performing domain adaptations of social media text by using lexical data transformations.

The DALDT device 202 is described and illustrated in FIG. 3 as including a domain adaptation via lexical data transformations module 302, although it may include other rules, policies, modules, databases, or applications, for example. As will be described below, the domain adaptation via lexical data transformations module 302 is configured to implement a method for performing domain adaptations of social media text by using lexical data transformations in order to improve performance in a machine learning model that is designed to perform natural language processing tasks.

An exemplary process 300 for implementing a mechanism for performing domain adaptations of social media text by using lexical data transformations in order to improve performance in a machine learning model that is designed to perform natural language processing tasks by utilizing the network environment of FIG. 2 is illustrated as being executed in FIG. 3. Specifically, a first client device 208(1) and a second client device 208(2) are illustrated as being in communication with DALDT device 202. In this regard, the first client device 208(1) and the second client device 208(2) may be "clients" of the DALDT device 202 and are described herein as such. Nevertheless, it is to be known and understood that the first client device 208(1) and/or the second client device 208(2) need not necessarily be "clients" of the DALDT device 202, or any entity described in association therewith herein. Any additional or alternative relationship may exist between either or both of the first client device 208(1) and the second client device 208(2) and the DALDT device 202, or no relationship may exist.

Further, DALDT device 202 is illustrated as being able to access a standard English textual data repository 206(1) and a social media formats and usages database 206(2). The domain adaptation via lexical data transformations module 302 may be configured to access these databases for implementing a method for performing domain adaptations of social media text by using lexical data transformations in order to improve performance in a machine learning model that is designed to perform natural language processing tasks.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DALDT device 202 via broadband or cellular communication. Of course, these embodiments are merely exemplary and are not limiting or exhaustive.

Upon being started, the domain adaptation via lexical data transformations module 302 executes a process for performing domain adaptations of social media text by using lexical data transformations in order to improve performance in a machine learning model that is designed to perform natural language processing tasks. An exemplary process for performing domain adaptations of social media text by using lexical data transformations in order to improve performance in a machine learning model that is designed to perform natural language processing tasks is generally indicated at flowchart 400 in FIG. 4.

Figure 4:
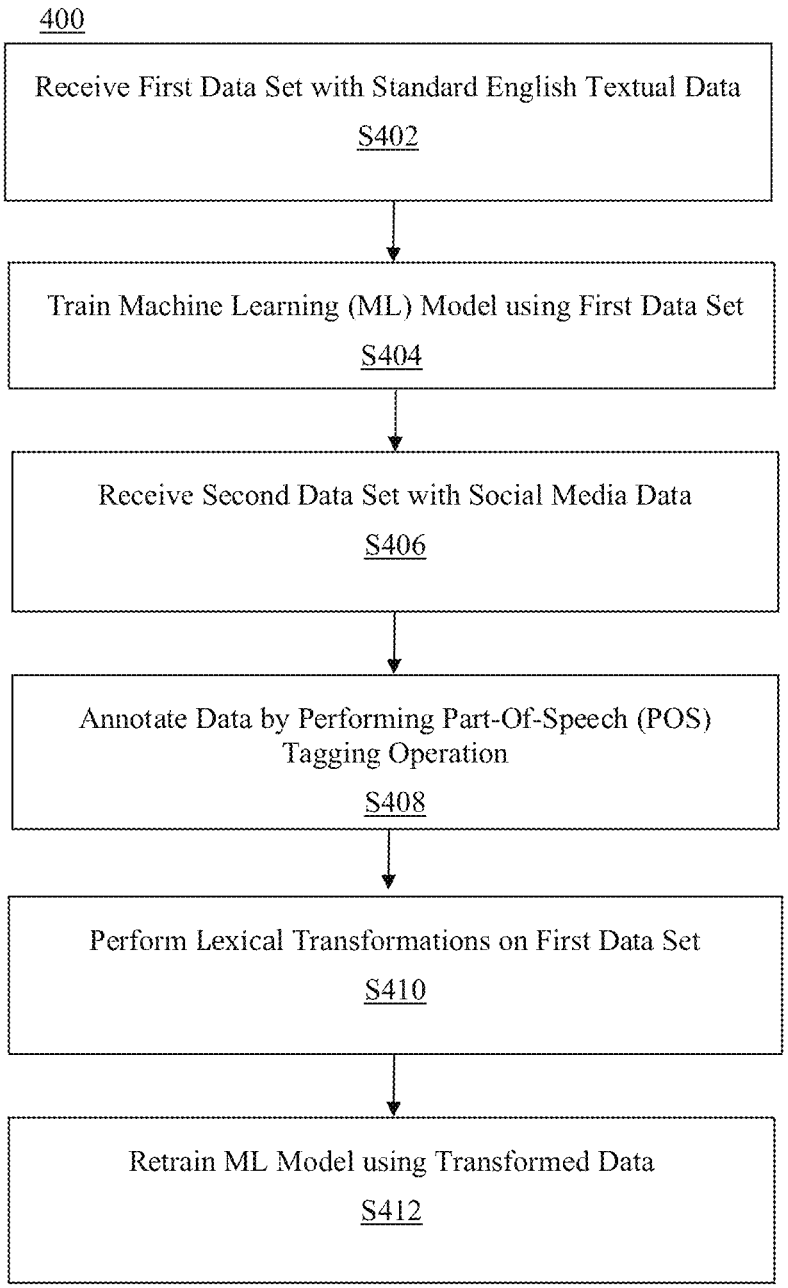
FIG. 4 is a flowchart of an exemplary process for implementing a method for performing domain adaptations of social media text by using lexical data transformations.

In process 400 of FIG. 4, at step S402, the domain adaptation via lexical data transformations module 302 receives a first data set that is usable for training a machine learning (ML) model that is designed to perform natural language processing (NLP) tasks. In an exemplary embodiment, the first data set is a standard English dataset that may include a large corpus of documents that originate from a variety of sources. Then, at step S404, the domain adaptation via lexical data transformations module 302 trains the ML model by using the first data set.

At step S406, the domain adaptation via lexical data transformations module 302 receives a second data set that relates to a social media platform. In an exemplary embodiment, the social media platform may include any one or more of Twitter®, Facebook®, Instagram®, TikTok®, and/or any other suitable social media platform, and the second data set may include a set of posts that have been obtained from the social media platform. Then, at step S408, the domain adaptation via lexical data transformations module 302 annotates the data in each of the first data set and the second data set by performing a part-of-speech (POS) tagging operation with respect to each item of data.

At step S410, the domain adaptation via lexical data transformations module 302 performs lexical transformations on at least a subset of the first data set in order to generate a third data set that includes results of the transformations. In an exemplary embodiment, the lexical transformations may include any one or more of the following: injecting one or more emojis into a sentence; injecting one or more emoticons into a sentence; performing an inverse lexical normalization upon a word and/or a phrase; injecting a user mention by adding an "@" sign to a proper noun; injecting a hashtag by adding a "#" sign to a proper noun; injecting an indication that a particular social media post has been retransmitted by a recipient thereof; and injecting a Uniform Resource Locator (URL) to a sentence. In an exemplary embodiment, when the social media platform is Twitter®, the indication of retransmission may include a re-tweet indication.

At step S412, the domain adaptation via lexical data transformations module 302 retrains the ML model by using the transformed data that results from the transformations performed in step S410, i.e., the third data set. In an exemplary embodiment, the retraining of the ML model is performed by using the first data set, the second data set, and the third data set.

Domain adaptation is an important and widely studied problem in natural language processing. A large body of literature tries to solve this problem by adapting the model trained on the source domain to the target domain. In an exemplary embodiment, conversely, this problem is approached from a dataset perspective. In this aspect, the source domain dataset may be modified with lexical transformations in order to reduce the mismatch between the source dataset distribution and the target dataset distribution. It has been found that models trained on the transformed source domain dataset perform significantly better than zero-shot models. By using the proposed lexical data transformations to convert standard English to tweets, an unsupervised part-of-speech (POS) tagging accuracy of 92.14% may be achieved, as compared with 81.54% zero shot accuracy, which is only slightly below the supervised performance of 94.45%.

Figure 5:
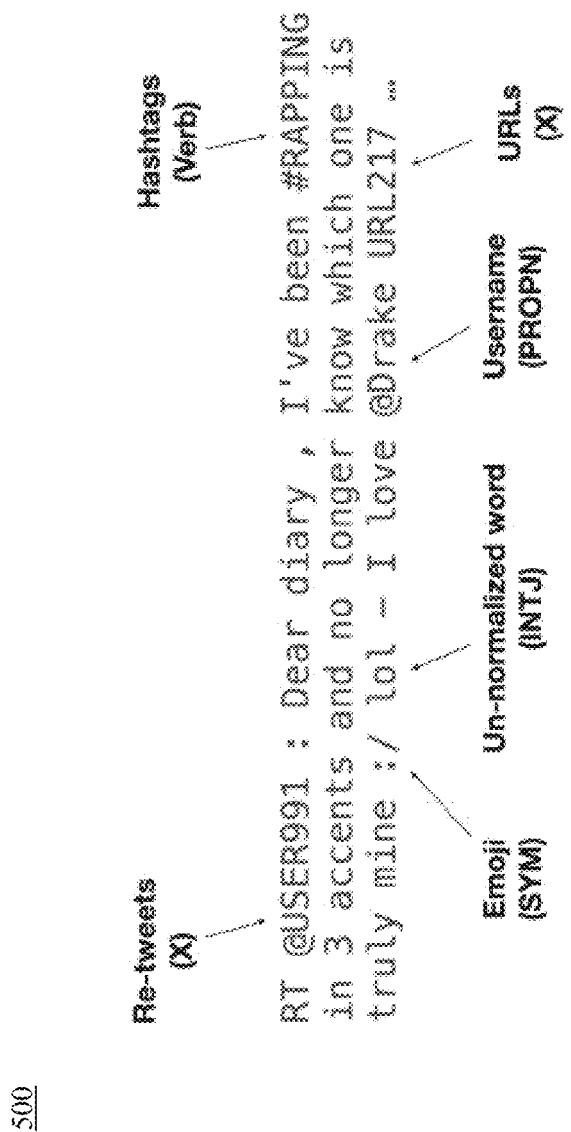
FIG. 5 is a diagram that illustrates various lexical features of a textual social media post that may be used as an input for a method for performing domain adaptations of social media text by using lexical data transformations, according to an exemplary embodiment.

FIG. 5 is a diagram 500 that illustrates various lexical features of a textual social media post that may be used as an input for a method for performing domain adaptations of social media text by using lexical data transformations, according to an exemplary embodiment. FIG. 6 is a diagram 600 that illustrates sentences that have been transformed by applying a method for performing domain adaptations of social media text by using lexical data transformations, according to an exemplary embodiment.

Lexical Data Transformation: Standard English sentences and Twitter® tweets have both semantic and lexical differences. Tweets are more likely to be subjective and polarized. Conversely, tweets also contain unique lexical characteristics including acronyms, emojis, user mentions, re-tweets, and hashtags, as shown in FIG. 5, and can be used as different parts of speech. In an exemplary embodiment, there is a focus on converting standard English into tweets lexically by injecting some of these lexical features into standard English sentences, and also injecting labels wherever required, while retaining the annotations. Example transformations are shown in FIG. 6.

Lexical data transformations add lexical features to the source domain dataset such that these properties are distributionally conserved. For example, when the target domain dataset is Twitter®, it is expected that tweets will contain emojis. The lexical distributional features of emojis in tweets are measurable, such as, for example, the percentage of tweets that on average contain emojis or how they are distributed within the sentence, i.e., whether the emojis are more likely to occur in the beginning, middle, or end of a sentence. When lexical data transformations are performed, it is preferred that these distributional properties be present in the transformed source domain dataset as well. This objective may be accomplished by artificially injecting different lexical features as further described below. In addition, because these features are being added to an annotated dataset, corresponding labels for each lexical feature are also injected wherever required. The resulting sentences are almost indistinguishable from tweets, as can be seen in FIG. 6. It is not trivial to inject these lexical features into the standard English sentences, as a same lexical feature may correspond to multiple parts of speech.

Datasets: In an exemplary embodiment, two annotated POS tagging datasets may be used for experimental purposes. For standard English, the Georgetown University Multilayer (GUM) Corpus dataset may be used, and for Twitter® data, the Tweebank (also referred to herein as "TBv2") dataset may be used. These two datasets are particularly useful because they are both labeled using the universal dependencies framework, and thus, each of the datasets has 17 POS tags. The dataset statistics are shown in Table 1.

TABLE 1

Statistics for GUM and Tweebank Datasets

| Dataset | Split | Sentences | Tokens |
|---|---|---|---|
| GUM | Train | 6,917 | 124,923 |
| Tweebank | Train | 1,639 | 24,753 |
|  | Test | 1,201 | 19,911 |

The GUM dataset acts as the source domain dataset and is about five times larger than Tweebank, which acts as the target domain dataset. The GUM dataset is made up of articles and interviews from Wikinews, instructional articles from wikiHow and travel guides from Wikivoyage. The GUM dataset contains longer sentences compared to the Tweebank dataset. The Tweebank dataset has higher average polarity and subjectivity scores when compared to the GUM dataset.

Experiments: Four different types of lexical data transformations for Twitter® as target domain are used. All lexical transformations are performed on the GUM train-split (i.e., the standard English dataset), and the resultant model is tested on the Tweebank test set (i.e., the Twitter® dataset). All experiments report accuracy scores on the Tweebank test set. Each experiment is repeated five times and the mean score is reported, with standard deviations reported in brackets.

All experiments in the present disclosure are done using the Huggingface implementation of different Bidirectional Encoder Representations from Transformers (BERT) models. Five different BERT models are used: the original BERT-base-uncased and BERT-large-uncased models, the ROBERTa-base and ROBERTa-large models, and the BERTweet model.

Zero-Shot Experiments: First, the model is trained on the original GUM train-split, and then the model is tested on the Tweebank dataset. This experiment sets a baseline for unsupervised domain adaptation, as it represents zero-shot application of a model trained on standard English, and then applied to tweets. The results are shown as the Zero Shot results of Table 2 below.

Inverse Lexical Normalization: Lexical normalization is a common task where non-standard English tokens are corrected to standard English. This includes expanding acronyms such as "wru" to "where are you" and correcting spelling errors. In an exemplary embodiment, the inverse of this operation is performed by converting standard English to its lexically un-normalized version. This process is referred to herein as Inverse Lexical Normalization (ILN). To do so, a lexical normalization dataset is used as a dictionary lookup and a mapping is created between lexically correct words and their un-normalized versions. For example, "you" is written in various different ways, including "u", "uuuu", and "youuuu". The correct tokens are randomly replaced with their un-normalized versions for 75% of the occurrences.

As shown in Table 2 above, BERT-base again observes maximum improvement with ILN. The ROBERTa models are trained on large amounts of internet text and are already robust to lexically un-normalized text. It is hypothesized that BERT-large models are better able to infer meaning from context in case of spelling errors.

Injecting User Mentions and Hashtags: Another distinguishing lexical feature of tweets is the use of user mentions and hashtags. In this lexical transformation, existing proper nouns in the GUM dataset are randomly selected and converted into user mentions or hashtags by adding either an "@" symbol or a "#" symbol in front of the token, with a probability of 50% and 20% respectively. The existing proper noun labels are kept for the converted tokens. As shown in Table 2 above, there are consistent improvements with this transformation for all models except ROBERTa models.

Injecting re-tweets, URLs, user-mentions and hashtags as X: The "X" part-of-speech tag is defined as the other category in the universal dependency framework as follows: "The tag X is used for words that for some reason cannot be assigned a real POS category. It should be used very restrictively." While the "X" POS tag is used sparingly in standard English, a large number of tokens in tweets fall into this category. In this lexical transformation, re-tweets are

TABLE 2

Performance boost for unsupervised domain adaptation from standard English to tweets.

| Method | POS | BERT-base | RoBERTa-base | BERT-large | RoBERTa-Large | BERTweet |
|---|---|---|---|---|---|---|
| Zero Shot | — | 79.74 (0.26) | 80.87 (0.19) | 81.52 (0.23) | 81.83 (0.23) | 80.73 (0.25) |
| Emoji Inject | SYM | 80.12 (0.19) | 80.85 (0.43) | 81.08 (0.68) | 81.77 (0.51) | 81.59 (0.60) |
| ILN | — | 80.66 (0.23) | 79.43 (0.18) | 81.33 (0.13) | 80.95 (0.45) | 80.46 (0.34) |
| @, #ht | PROPN | 81.89 (0.06) | 80.87 (0.08) | 82.28 (0.04) | 81.92 (0.19) | 82.15 (0.14) |
| RT, #ht, url | X | 89.33 (0.08) | 88.09 (0.12) | 89.76 (0.09) | 88.95 (0.21) | 88.89 (0.17) |

Emoji Injections: Social media text is filled with emojis and emoticons, which are collectively referred to herein as emojis. To lexically convert standard English sentences to tweets, emojis may be injected into standard English sentences. Emojis belong to the "SYM: symbol" class in the universal dependencies framework.

To place an emoji within a standard English sentence, an emoji is randomly selected from a predetermined list of emojis. Then the emoji is placed inside a sentence according to a Gaussian distribution which is fitted to the location of occurrence of emojis in a tweet. Emojis are randomly added to 25% of the sentences in the GUM dataset. As shown in Table 2 above, the BERT-base model observes maximum improvement with emoji injection.

inserted at the beginning of sentences; URLs are inserted, usually at the back of the sentences; and hashtags are inserted in accordance with a random sampling from a Gaussian distribution calculated from tweets. Re-tweets are added in 30% of the sentences, URLs are added in 60% of the sentences, and hashtags are added in 10% of the sentences.

As shown in Table 2 above, significant improvements across the board are realized by adding this lexical transformation. This is because the "X" POS tag, which is probably the most under-utilized tag when dealing with standard English, becomes vital when dealing with tweets. All re-tweets and URLs and many hashtags and user mentions fall under this category.

TABLE 3

| Domain Adaptation Performance with Lexical Data Transformations | | | | | | |
|---|---|---|---|---|---|---|
| Type | Train Dataset | BERT-base | RoBERTa-base | BERT-large | RoBERTa-Large | BERTweet |
| Unsupervised | GUM | 79.74 (0.26) | 80.87 (0.19) | 81.52 (0.23) | 81.83 (0.23) | 80.73 (0.25) |
| | GUM-T | 91.82 (0.07) | 90.85 (0.08) | 92.14 (0.12) | 90.86 (0.61) | 90.99 (0.24) |
| Supervised | TBv2 | 93.88 (0.05) | 93.00 (0.03) | 94.45 (0.04) | 93.85 (0.08) | 93.85 (0.09) |
| | TBv2 + GUM | 94.31 (0.06) | 94.16 (0.06) | 94.51 (0.05) | 94.61 (0.08) | 94.71 (0.08) |
| | TBv2 + GUM-T | 94.81 (0.02) | 94.84 (0.06) | 95.01 (0.05) | 95.04 (0.04) | 95.21 (0.03) |

Results and Discussion: All lexical transformations are combined together, as shown in Table 3 above. The first row in Table 3 shows models trained on the original GUM dataset, representing zero-shot results. The GUM-T dataset represents a lexically transformed dataset containing all the previously described transformations. The model trained on the GUM-T dataset represents an unsupervised domain adaptation performance, which is able to reach within 2% of the supervised results without ever seeing a single tweet, with a 10.39% improvement when averaged over all 5 models.

The lexically transformed dataset GUM-T is then used for data augmentation in supervised learning to determine whether it provides additional signals to the models. Two supervised models are trained: one on the combination of TBv2 and GUM, and the other on TBv2 and GUM-T. As shown above in Table 3, the combination of TBv2 and GUM-T datasets outperforms all supervised models.

In an exemplary embodiment, a significant focus has been provided on converting noisy social media text to standard English. A novel approach to convert standard English into noisy user generated social media text by using simple lexical transformations is disclosed, and a showing that it can be used an effective unsupervised domain adaptation technique for social media text is made. The approach also contemplates generalization of this technique between different source-target domain pairs and for different tasks.

Accordingly, with this technology, an optimized process for performing domain adaptations of social media text by using lexical data transformations in order to improve performance in a machine learning model that is designed to perform natural language processing tasks is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing domain adaptations of social media text by using lexical data transformations for training machine learning models, the method being implemented by at least one processor, the method comprising:
  receiving, by the at least one processor, a first data set that is usable for training a bidirectional Encoder Representations from Transformers (BERT) based machine learning (ML) model that is designed to perform natural language processing tasks;
  training, by the at least one processor, the BERT-based ML model by using the first data set;
  receiving, by the at least one processor, a second data set that relates to a social media platform;
  annotating each of the first data set and the second data set by performing a part-of-speech (POS) tagging operation on each item included in each of the first data set and the second data set;
  transforming, by the at least one processor and based on the annotating of each of the first data set and the second data set, a subset of the first data set into a third data set that is suitable for the social media platform, wherein the transforming operation includes applying domain adaptations to the subset of the first data set based on the second data set to generate the third data set that has lexical features associated with a social media post; and
  retraining, by the at least one processor, the first BERT-based ML model by using a combination of the first data set, the second data set, and the third data set.

2. The method of claim 1, wherein the transforming comprises injecting at least one from among at least one emoji and at least one emoticon into at least one sentence included in the first data set, wherein a selecting of the at least one from among the at least one emoji and the at least one emoticon to be injected is based on the annotating operation and the social media platform.

3. The method of claim 1, wherein the transforming comprises performing an inverse lexical normalization for at least one from among at least one word and at least one phrase included in the first data set, wherein the inverse lexical normalization includes converting standard English words to a lexically un-normalized version based on a mapping between lexically correct words and their un-normalized versions.

4. The method of claim 1, wherein the transforming comprises injecting at least one user mention by adding an "@" sign to at least one proper noun included in the first data set.

5. The method of claim 1, wherein the transforming comprises injecting at least one hashtag by adding a "#" sign to at least one proper noun included in the first data set.

6. The method of claim 1, wherein the transforming comprises injecting at least one indication that a social media post has been retransmitted to at least one sentence included in the first data set, wherein the injecting is based on the annotating operation and the social media platform.

7. The method of claim 1, wherein the transforming comprises injecting at least one Uniform Resource Locator (URL) to at least one sentence included in the first data set.

8. A computing apparatus for performing domain adaptations of social media text by using lexical data transformations for training machine learning models, the computing apparatus comprising:
  a processor;
  a memory; and
  a communication interface coupled to each of the processor and the memory,
  wherein the processor is configured to:
    receive, via the communication interface, a first data set that is usable for training a bidirectional Encoder Representations from Transformers (BERT) based machine learning (ML) model that is designed to perform natural language processing tasks;
    train the BERT-based ML model by using the first data set;
    receive, via the communication interface, a second data set that relates to a social media platform;
    annotate each of the first data set and the second data set by performing a part-of-speech (POS) tagging operation on each item included in each of the first data set and the second data set;
    transform, based on the annotating of each of the first data set and the second data set, a subset of the first data set into a third data set that is suitable for the social media platform, wherein the transforming operation includes applying domain adaptations to the subset of the first data set based on the second data set to generate the third data set that has lexical features associated with a social media post; and retrain the BERT-based ML model by using a combination of the first data set, the second data set, and the third data set.

9. The computing apparatus of claim 8, wherein the processor is further configured to perform the transformation by injecting at least one from among at least one emoji and at least one emoticon into at least one sentence included in the first data set, wherein selecting of the at least one from among the at least one emoji and the at least one emoticon to be injected is based on the annotating operation and the social media platform.

10. The computing apparatus of claim 8, wherein the processor is further configured to perform the transformation by performing an inverse lexical normalization for at least one from among at least one word and at least one phrase included in the first data set, wherein the inverse lexical normalization includes converting standard English words to a lexically un-normalized version based on a mapping between lexically correct words and their un-normalized versions.

11. The computing apparatus of claim 8, wherein the processor is further configured to perform the transformation by injecting at least one user mention by adding an @ sign to at least one proper noun included in the first data set.

12. The computing apparatus of claim 8, wherein the processor is further configured to perform the transformation by injecting at least one hashtag by adding a "#" sign to at least one proper noun included in the first data set.

13. The computing apparatus of claim 8, wherein the processor is further configured to perform the transformation by injecting at least one indication that a social media post has been retransmitted to at least one sentence included in the first data set, wherein the injecting is based on the annotating operation and the social media platform.

14. The computing apparatus of claim 8, wherein the processor is further configured to perform the transformation by injecting at least one Uniform Resource Locator (URL) to at least one sentence included in the first data set.

15. A non-transitory computer readable storage medium storing instructions for performing domain adaptations of social media text by using lexical data transformations for training machine learning models, the storage medium comprising executable code which, when executed by a processor, causes the processor to:
- receive a first data set that is usable for training a first bidirectional Encoder Representations from Transformers (BERT) based machine learning (ML) model that is designed to perform natural language processing tasks;
- train the BERT-based ML model by using the first data set;
- receive a second data set that relates to a social media platform;
- annotate each of the first data set and the second data set by performing a part-of-speech (POS) tagging operation on each item included in each of the first data set and the second data set;
- transform, based on the annotating of each of the first data set and the second data set, a subset of the first data set into a third data set that is suitable for the social media platform, wherein the transforming operation includes applying domain adaptations to the subset of the first data set based on the second data set to generate the third data set that has lexical features associated with a social media post; and
- retrain the BERT-based ML model by using a combination of the first data set, the second data set, and the third data set.

* * * * *